United States Patent

Meyerhoefer

[11] Patent Number: 6,044,194
[45] Date of Patent: Mar. 28, 2000

[54] FIBER OPTIC CABLE BEND RADIUS CONTROL

[75] Inventor: Carl E. Meyerhoefer, Commack, N.Y.

[73] Assignee: TII-Ditel, Inc., Hickory, N.C.

[21] Appl. No.: 09/261,610

[22] Filed: Feb. 26, 1999

Related U.S. Application Data

[63] Continuation of application No. 08/819,407, Mar. 17, 1997.

[51] Int. Cl.[7] .................................................. G02B 6/00
[52] U.S. Cl. ............................................ 385/134; 385/135
[58] Field of Search ..................................... 385/134–135

[56] References Cited

U.S. PATENT DOCUMENTS

| | | |
|---|---|---|
| 2,258,745 | 11/1941 | Dewey et al. . |
| 4,157,799 | 6/1979 | Simon . |
| 4,717,231 | 1/1988 | Dewez et al. . |
| 4,835,921 | 6/1989 | Baggett, Jr. et al. . |
| 5,065,556 | 11/1991 | DeLong et al. . |
| 5,067,784 | 11/1991 | Debortoli et al. . |
| 5,079,389 | 1/1992 | Nelson . |
| 5,100,221 | 3/1992 | Carney et al. . |
| 5,119,459 | 6/1992 | Meyerhoefer et al. . |
| 5,241,617 | 8/1993 | Peacock et al. . |
| 5,280,138 | 1/1994 | Preston et al. . |
| 5,287,428 | 2/1994 | Shibata . |
| 5,335,349 | 8/1994 | Kutsch et al. . |
| 5,339,379 | 8/1994 | Kutsch et al. ........................ 385/135 |
| 5,353,367 | 10/1994 | Czosnowski et al. . |
| 5,394,502 | 2/1995 | Caron . |
| 5,469,893 | 11/1995 | Caveney et al. . |
| 5,488,198 | 1/1996 | Preston et al. . |
| 5,640,482 | 6/1997 | Barry et al. ........................ 385/135 |

FOREIGN PATENT DOCUMENTS

| | | |
|---|---|---|
| 37 42 448 | 6/1989 | Germany . |
| 403 904 | 6/1966 | Switzerland . |

*Primary Examiner*—Rodney Bovernick
*Assistant Examiner*—Ellen E. Kim
*Attorney, Agent, or Firm*—Adam Law Firm, P.A.

[57] ABSTRACT

A cable bend radius control attachment is used in combination with a cable-routing, vertical, slotted channel member defined by walls and including a plurality of longitudinally spaced cable slots. The cable slots are adapted for receiving and distributing optical fiber cable into and out of the vertical channel member. The attachment includes a generally U-shaped flange having an inner edge portion secured to a mouth of the cable slot and an opposing outer edge portion spaced from the mouth of the cable slot. The flange has a generally convex, arcuate surface between its inner and outer edge portions for extending outwardly from the channel member at a mouth of the cable slot. The flange defines a predetermined minimum bend radius for cable entering or exiting the channel member through the cable slot. The flange includes a base and opposing resilient sides integrally-formed with the base. The opposing sides are flexible inwardly to insert the inner edge portion of the flange into the mouth of the cable slot, and recovering to hold the flange in position at the mouth of the cable slot.

6 Claims, 6 Drawing Sheets

FIBER OPTIC CABLE BEND RADIUS CONTROL

This application is a continuation application of U.S. Ser. No. 08/819,407 filed Mar. 17, 1997.

TECHNICAL FIELD

This invention relates to fiber optic cable bend radius control and, more specifically, an apparatus and method for controlling the bend radius of fiber optic cables.

BACKGROUND OF THE INVENTION

Optical fiber communication systems are extensively used in the telecommunications industry. Communication systems employing optical fibers have termination points where optical fiber cross connections, interconnections and terminations are performed. The termination points are generally located at a customer's premises, remote from a central office.

At each termination point, optical fibers must be separated from outer protective cable components for splicing and termination. Several different types of enclosures or equipment racks for use at the termination points are available to protect optical fibers and fiber optic cables. These include, for example, the enclosures or equipment racks described in the U.S. Pat. No. 5,353,367 to Czosnowski et al. dated Oct. 4, 1994, U.S. Pat. No. 5,119,459 to Meyerhoefer et al. dated Jun. 2, 1992, U.S. Pat. No. 5,241,617 to Peacock et al. dated Aug. 31, 1993, U.S. Pat. No. 5,067,784 to Debortoli et al dated Nov. 26, 1991, U.S. Pat. No. 4,717,231 to Dewez et al. dated Jan. 5, 1988 and U.S. Pat. No. 5,287,428 to Shibata dated Feb. 15, 1994.

Fiber optic cables are routed from the enclosure or equipment rack through a building using various types of supports. For example, fiber optic cable raceway systems comprised of U-shaped channel members of various shapes and sizes are available to permit such routing. Straight walled and curved U-shaped channel members may be used to provide support and bend radius control for fiber optic cables as shown in U.S. patent application Ser. No. 08/425,798, now abandoned, U.S. patent application Ser. No. 08/768,127, now abandoned, U.S. Pat. No. 5,335,349 to Kutsch et al. dated Aug. 2, 1994, U.S. Pat. No. 5,394,502 to Caron dated Feb. 28, 1995 and U.S. Pat. No. 5,469,893 to Caveney et al dated Nov. 28, 1996.

Abutting one side of the enclosure or equipment rack is a U-shaped channel member having slots. The slots in the slotted channel member line up with openings in the enclosure or equipment rack. The slotted channel member is connected to the fiber optic cable raceway system. Thus, fiber optic cables can be routed from the enclosure or equipment rack through the openings, slots and slotted channel member to the fiber optic cable raceway system as shown, for example, in U.S. Pat. No. 5,287,428 to Shibata dated Feb. 15, 1994.

The slotted channel members have thin walls. The slots are cut in the thin walls of the slotted channel members and thus have thin, sharp edges. Fiber optic cables passing from the enclosure or equipment rack to the fiber optic cable raceway system through the slots in the slotted channel member rest on the thin, sharp edges of the slots. Resting the fiber optic cables on the thin, sharp edges of the slots may pull, bend, break or otherwise damage the fiber optic cables or may cause a loss of performance.

Thus, there is a need in the art for an inexpensive and easy to use apparatus and method to guide, protect and control the bend radius of fiber optic cables as they pass from an enclosure or equipment rack to a fiber optic cable raceway system through slots in a slotted channel member.

SUMMARY OF THE INVENTION

The invention is an apparatus for guiding, protecting and providing bend radius control for fiber optic cables and a method of using the same. More specifically, in accordance with the invention, fiber optic cable bend radius control devices are snapped into slots in the slotted channel member. Projections on the fiber optic cable bend radius control devices secure the devices to the thin, sharp edges of the slots.

Each fiber optic cable bend radius control device has a gradually curved surface facing inwardly into the slots. Fiber optic cables extending from the enclosure or equipment rack to the fiber optic cable raceway system through the slots rest on the curved surfaces of the fiber optic cable bend radius control devices. The curved surfaces of the fiber optic cable bend radius control devices provide smooth, continuous surfaces for guiding, protecting and controlling the bend radius of fiber optic cables as they pass through the slots.

BRIEF DESCRIPTION OF THE DRAWINGS

FIG. 4 is a perspective view of an alternative embodiment of the fiber optic cable bend radius control device in accordance with the invention.

DESCRIPTION OF PREFERRED EMBODIMENTS

Figure 1:
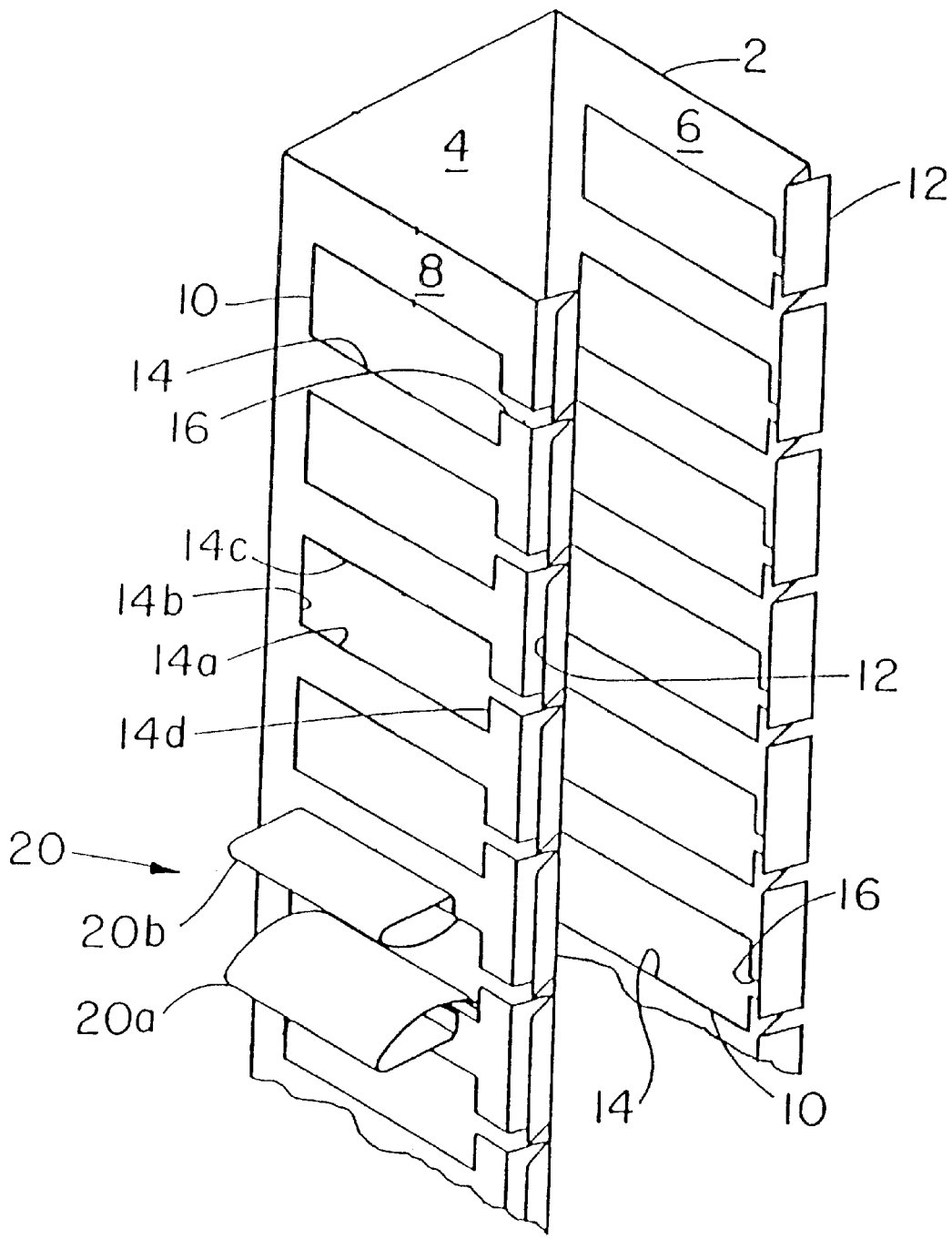
FIG. 1 is a perspective view of an embodiment of the fiber optic cable bend radius control device in accordance with the invention.

Referring to FIG. 1, there is shown an embodiment of the fiber optic cable bend radius control device 20 in accordance with the invention in the environment of its intended use. Channel member 2 has a base 4 and two side walls 6 and 8. The base 4 and side walls 6 and 8 are arranged so that the channel member 2 is U-shaped in cross-section. Side walls 6 and 8 each have two ends. One end of side wall 6 and one end of side wall 8 are attached to base 4. The opposite ends of side walls 6 and 8 are free.

Side walls 6 and 8 have slots 10. The slots 10 extend from the free end of side walls 6 and 8 toward the ends of side walls 6 and 8 that are attached to base 4.

Slots 10 have wide portions 14 and narrow portions 16. The wide portions of slots 10 are approximately centered on the side walls 6 and 8 between the ends of the side walls attached to the base 4 and the free ends. Wide portions 14 of slots 10 have edges 14a, 14b, 14c and 14d. The narrow portions 16 of slots 10 extend from the free ends of side walls 6 and 8 to the edges 14d of wide portions 14 of slots 10.

Side walls 6 and 8 have retainers 12 at the free ends of the side walls. Retainers 12 are designed to secure a cover (not shown) to channel member 2. The narrow portions 16 of slots 10 are located in between retainers 12 on the free ends of side walls 6 and 8.

Figure 2:
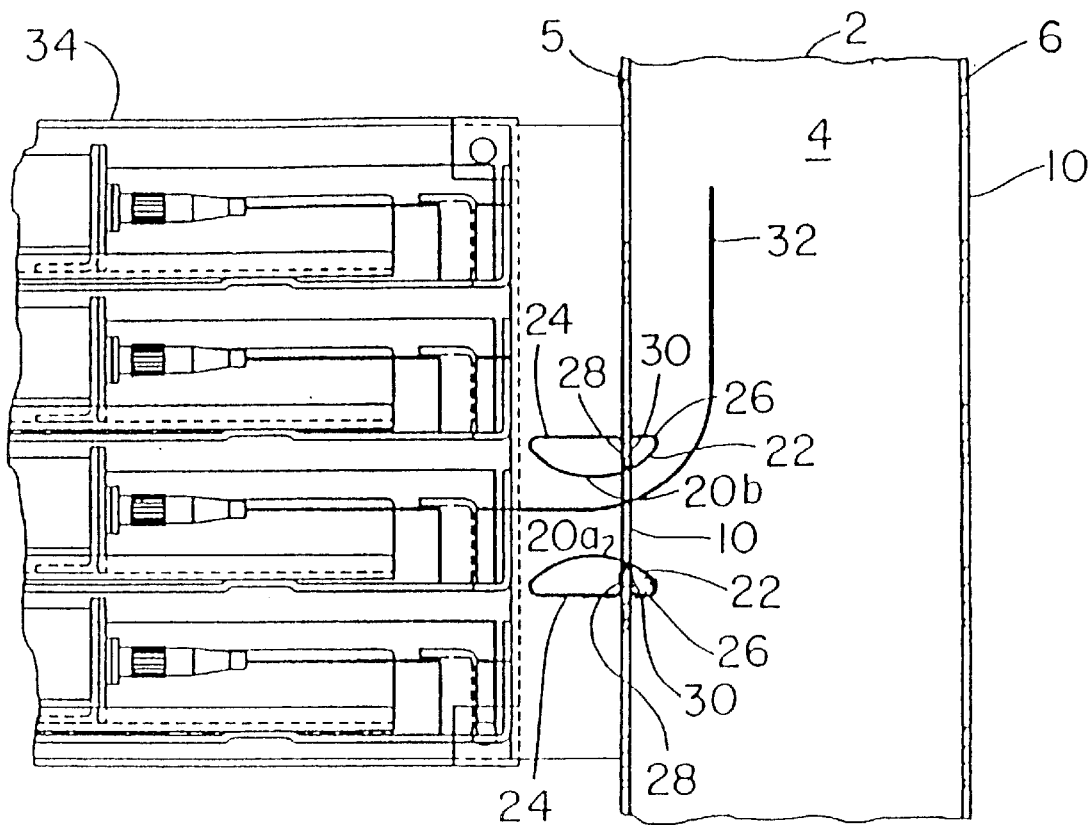
FIG. 2 is a cross-sectional view of an embodiment of the fiber optic cable bend radius control device in accordance with the invention.
Figure 3:
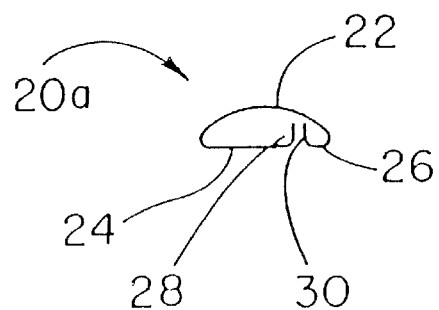
FIG. 3 is a side view of an embodiment of the fiber optic cable bend radius control device in accordance with the invention.

Referring to FIGS. 1–3, there is shown an embodiment of a fiber optic cable bend radius control device 20 in accordance with the invention. FIG. 2 shows a vertical cross-sectional of the fiber optic cable bend radius control device 20 in the environment of its intended use. FIG. 3 is side view of the fiber optic cable bend radius control device 20.

The fiber optic cable bend radius control device 20 attaches to the wide portion 14 of slot 10 of channel member 2. The embodiment of the fiber optic cable bend radius control device 20 shown in FIGS. 1–3, which comprises two parts 20a and 20b, specifically attaches to the opposite edges 14a and 14c of wide portion 14 of slot 10 in channel member 2.

When viewed in cross-section as shown in FIGS. 2 and from the side as shown in FIG. 3, each part 20a and 20b of the fiber optic cable bend radius control device 20 is comprised of a continuous sheet of material formed to have a gradually curved surface 22, horizontal portions 24 and 26 and closely spaced vertical portions 28 and 30. The fiber optic cable bend radius control device 20 is snapped onto opposite edges 14a and 14c of wide portion 14 of slot 10 in channel member 2. Vertical portions 28 and 30 frictionally engage and thereby secure the fiber optic cable bend radius control device 20 to the opposite edges 14a and 14c of wide portion 14 of slot 10 as shown in FIGS. 1 and 2.

Once the fiber optic cable bend radius control device 20 is secured to the opposite edges 14a and 14c of wide portion 14 of slot 10, fiber optic cable 32 in channel member 2 is placed in the narrow portion 16 of slot 10 and is pushed toward the wide portion 14 of slot 10 until the fiber optic cable 32 is in the wide portion 14 of slot 10. Once the fiber optic cable 32 is in the wide portion 14 of slot 10, the fiber optic cable can rest on the curved surface 22 of the fiber optic cable bend radius control device 20. Curved surface 22 provides a smooth and continuous surface to guide, protect and control the bend radius of fiber optic cables 32 extending from channel member 2 through slots 10 into enclosure 34.

Figure 5:
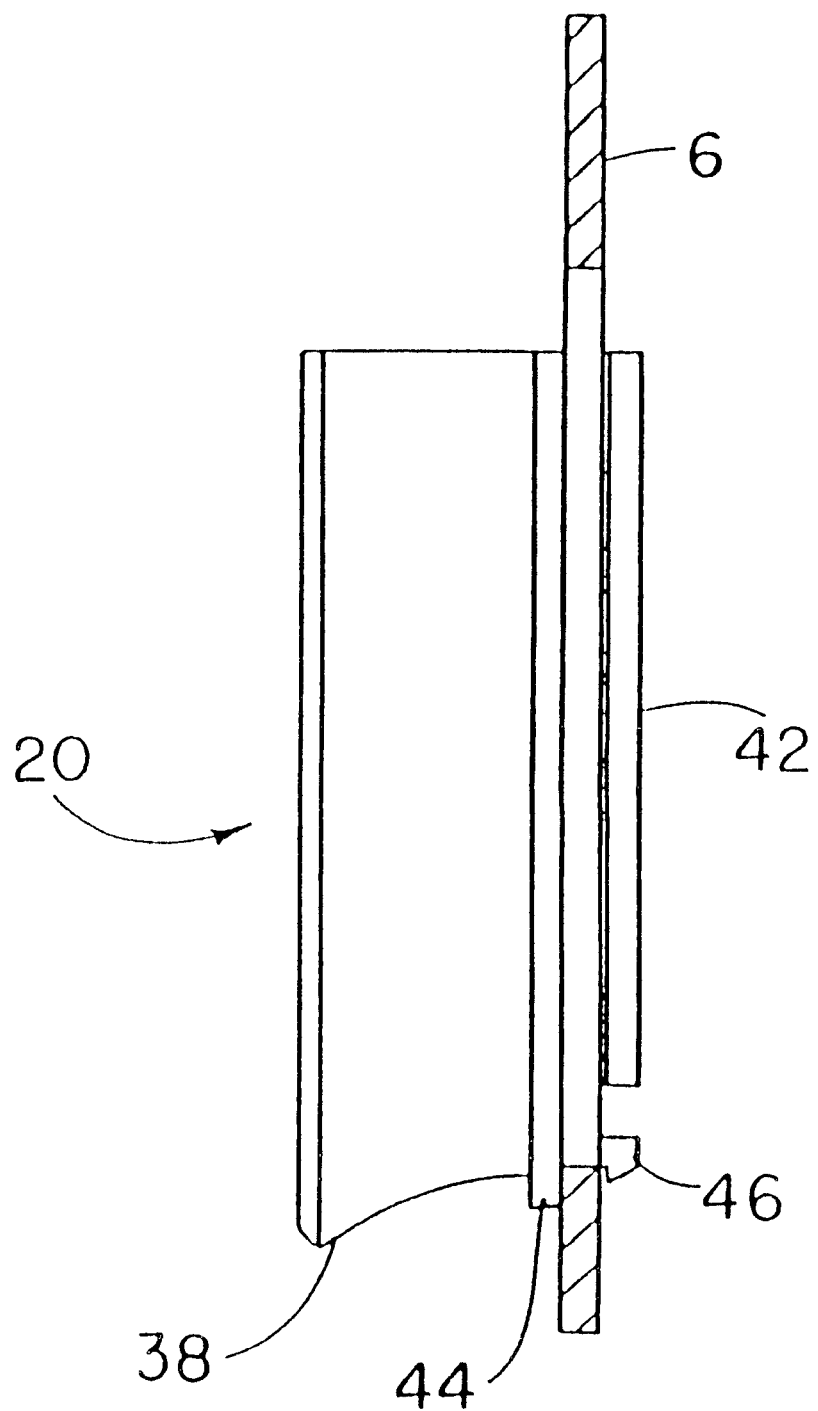
FIG. 5 is a side view of an alternative embodiment of the fiber optic cable bend radius control device in accordance with the invention.
Figure 6:
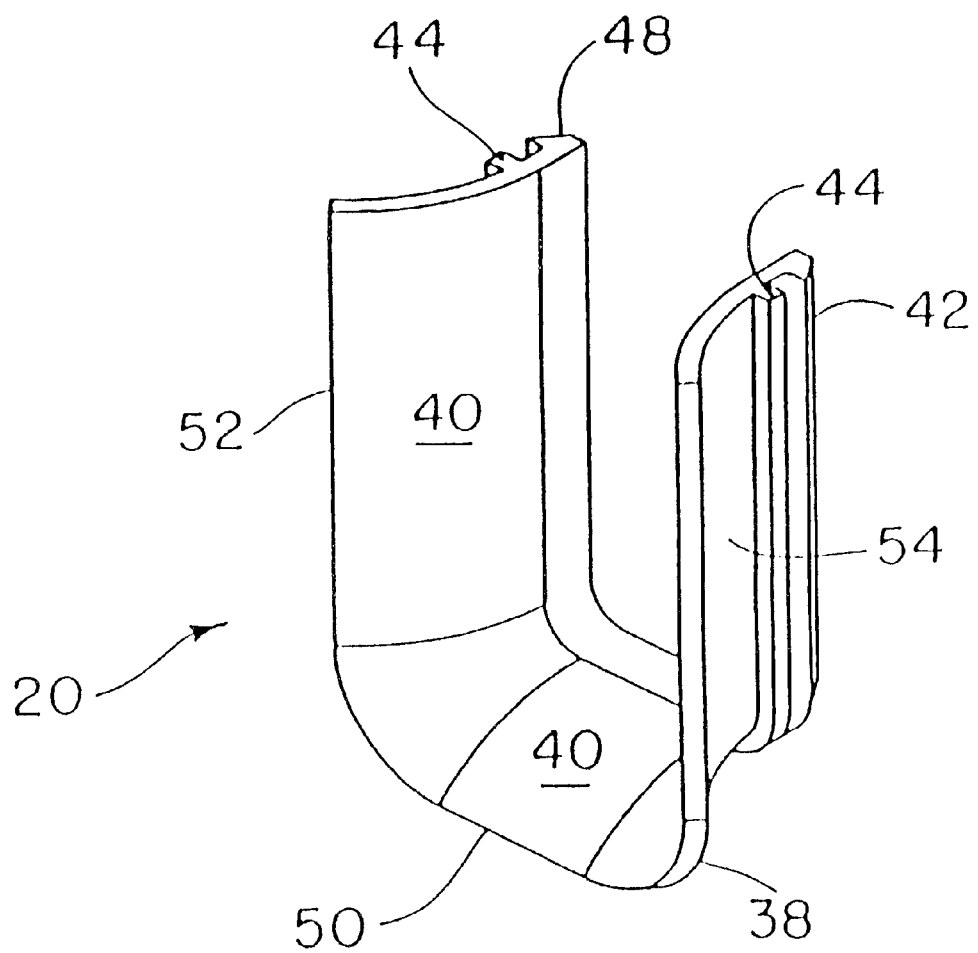
FIG. 6 is a perspective view of an alternative embodiment of the fiber optic cable bend radius control device in accordance with the invention.
Figure 7:
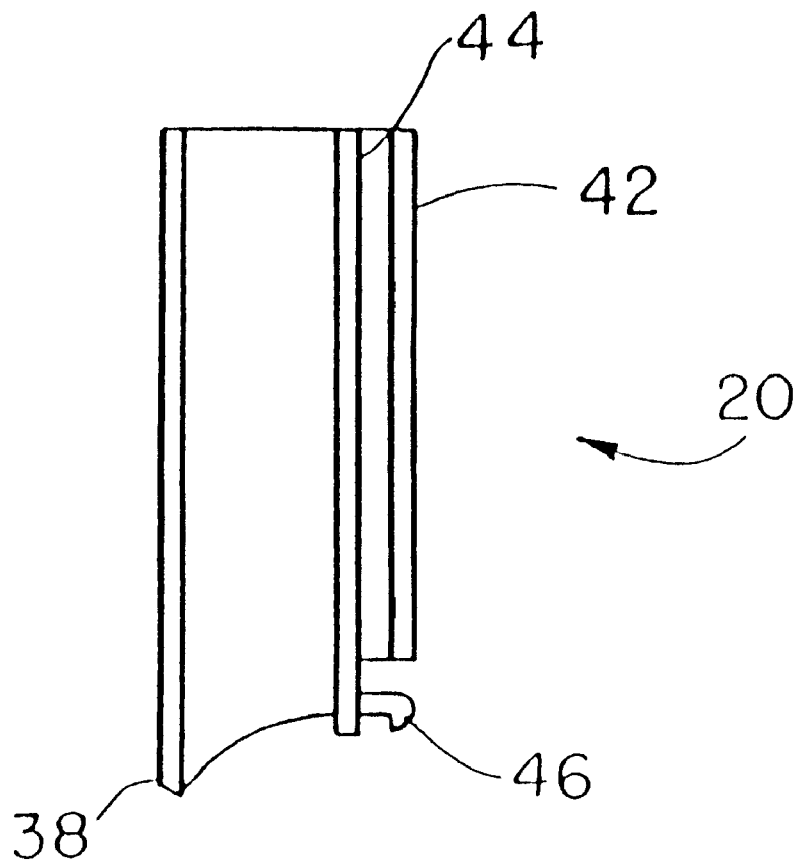
FIG. 7 is a side view of an alternative embodiment of the fiber optic cable bend radius control device in accordance with the invention.
Figure 8:
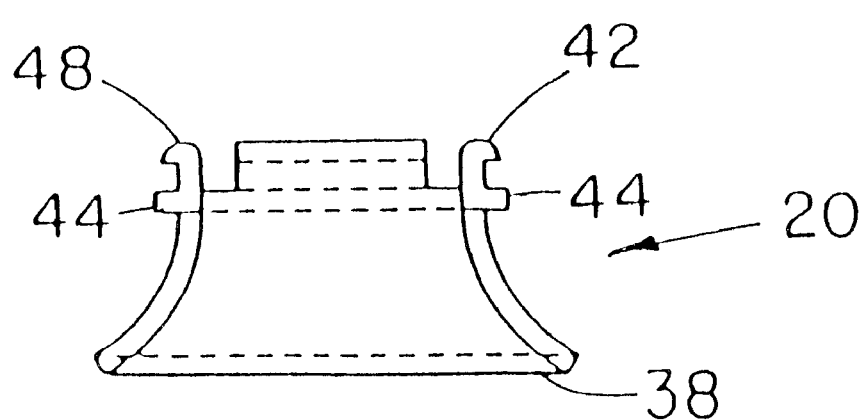
FIG. 8 is a top view of an alternative embodiment of the fiber optic cable bend radius control device in accordance with the invention.
Figure 9:
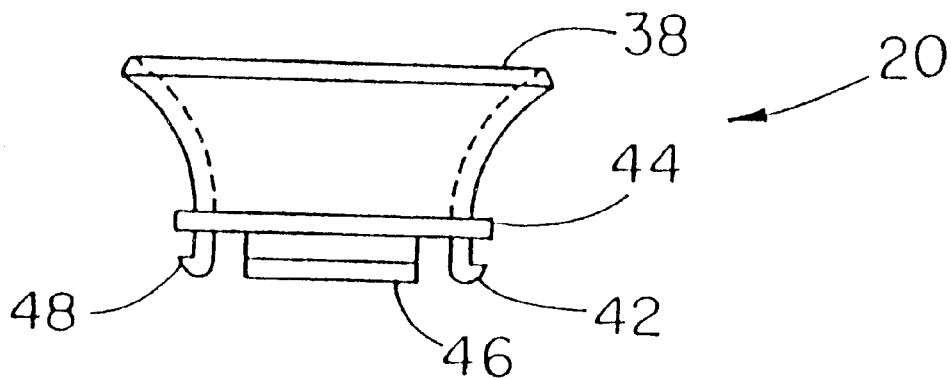
FIG. 9 is a bottom view of an alternative embodiment of the fiber optic cable bend radius control device in accordance with the invention.
Figure 10:
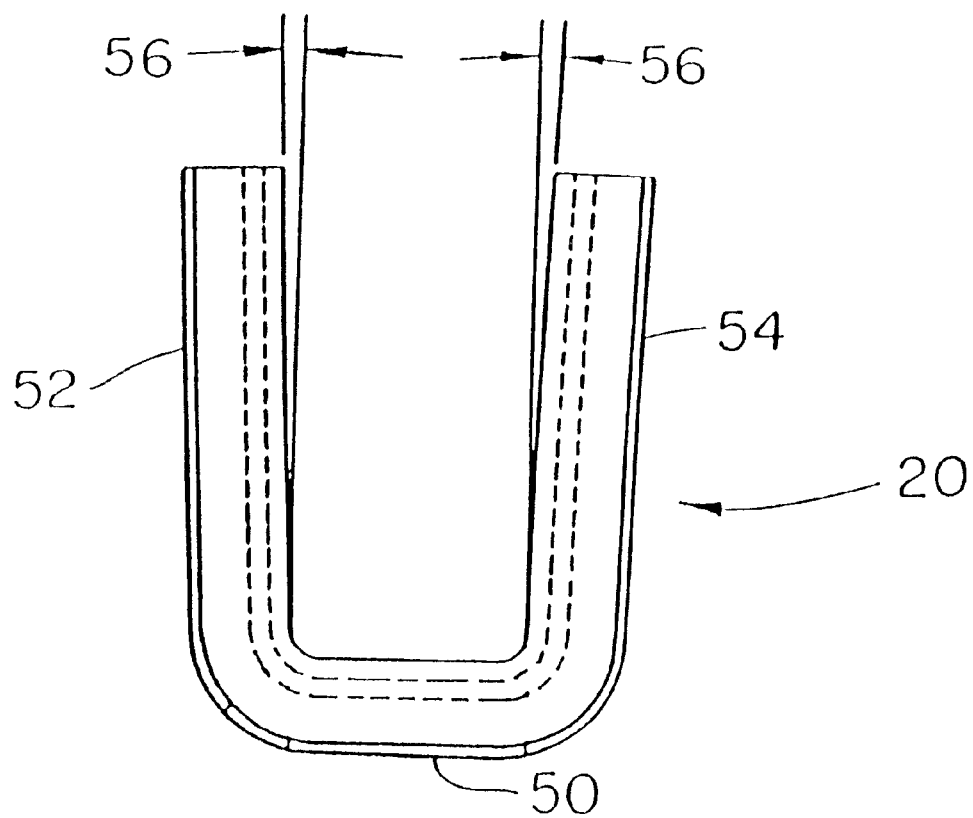
FIG. 10 is a front view of an alternative embodiment of the fiber optic cable bend radius control device in accordance with the invention.

Referring to FIGS. 4–10, there is shown another embodiment of a fiber optic cable bend radius control device 20' in accordance with the invention. FIG. 4 is a perspective view of the fiber optical cable bend radius control device 20' in the environment of its intended use. FIG. 5 is a side view of the fiber optic cable bend radius control device 20' in the environment of its intended use. FIG. 6 is a perspective view of the fiber optic cable bend radius control device 20'. FIG. 7 is a side view of the fiber optic cable bend radius control device 20'. FIG. 8 is a top view of the fiber optic cable bend radius control device 20'. FIG. 9 is a bottom view of the fiber optic cable bend radius control device 20'. FIG. 10 is a front view of the fiber optic cable bend radius control device 20' shown in a deflected position.

The fiber optic cable bend radius control device 20' attaches to the wide portion 14 of slot 10 of channel member 2. The embodiment of the fiber optic cable bend radius control device 20' shown in FIGS. 4–10 specifically attaches to the edges 14a, 14b and 14c of wide portion 14 of slot 10 in side wall 6 of channel member 2.

The fiber optic cable bend radius control device 20' is a U-shaped one piece trumpet design. The fiber optic cable bend radius control device 20' has projections 42, 44, 46 and 48 that cooperate to secure the device 20' in the wide portion 14 of slot 10. The fiber optic cable bend radius control device 20' is snapped into the wide portion 14 of slots 10 in channel member 2. Projections 42, 46 and 48 deflect as the fiber optic cable bend radius control device 20' is forced into the slot 10 and rebound when the device 20' is properly positioned in the wide portion 14 of the slot 10. Projection 44 serves as a backstop for the fiber optic cable bend radius control device 20' once fully inserted. In that manner, projections 42, 44, 46 and 48 secure the fiber optic cable bend radius control device 20' to the edges 14a, 14b and 14c of wide portion 14 of slot 10 of side wall 6 of channel member 2 as shown in FIGS. 4 and 5.

The fiber optic cable bend radius control device 20' has a base 50 and two sides 52 and 54 generally comprising the U-shaped device 20' and a portion 38 extending away from projections 42, 44, 46 and 48. As shown in FIG. 10, the sides 52 and 54 may be deflected, temporarily deforming the fiber optic cable bend radius control device 20' from its U-shaped cross-section to facilitate the attachment of the device 20' to edges 14a, 14b and 14c of wide portion 14 of slot 10. The flexure, shown at 56 in FIG. 10, is preferably up to two degrees with respect to each side 52 and 54 of the fiber optic cable bend radius control device 20'. The portion 38 of the fiber optic cable bend radius control device 20' extending away from projections 42, 44, 46 and 48 flares outwardly in a continuous gradually curved surface 40.

Once the fiber optic cable bend radius control device 20' is secured to the edges 14a, 14b and 14c of wide portion 14 of slot 10, fiber optic cable in slotted channel member 2 is placed in the narrow portion 16 of slot 10 and is pushed toward the wide portion 14 of slot 10 until the fiber optic cable is in the wide portion 14 of slot 10. Once the fiber optic cable is in the wide portion 14 of slot 10, the fiber optic cable can rest on the curved surface 40 of the fiber optic cable bend radius control device 20'. Curved surface 40 provides a smooth and continuous surface to guide, protect and control the bend radius of fiber optic cables extending from channel member 2 through slots 10 into an enclosure.

To guide, protect and control the ben d radius of optical fibers, the fiber optic cable bend radius control device in accordance with the invention must provide adequate support to and prevent uncontrolled bending or tension of the fiber optic cables. Constructing the fiber optic cable bend radius control device of suitable materials would be apparent to persons skilled in the art. The fiber optic cable bend radius control device in accordance with the invention is preferably formed of a flame resistant high impact thermoplastic material. Such a material is rigid but provides for some flexure during insertion of the fiber optic cable bend radius control device into the wide portion of the slot. With respect to the embodiment of the fiber optic cable bend radius control device 20' shown in FIGS. 1–3, flexure of the device 20' enable s frictional engagement of the vertical projections 28 and 30 with the opposite edges 14*a* and 14*b* of the wide portion 14 of the slot 10. With respect to the embodiment of the fiber optic cable bend radius control device 20' shown in FIGS. 4–10, flexure of th e device 20' enables deflection and rebound of the projections 42, 46 and 48 and deflection of sides 52 and 54 to enable securing of the device 20' to the edges 14*a*, 14*b* and 14*c* of the wide portion 14 of the slot 10. Other materials for construction of the fiber optic cable bend radius control device adequate to guide, protect, support and provide bend radius control would be apparent to persons skilled in the art.

The fiber optic cable bend radius control device in accordance with the invention is made of suitable dimensions to fulfill its intended purpose. For example, the embodiment of the fiber optic cable bend radius control device 20' shown in FIGS. 4–10 may be constructed having a height of 2.79 inches, a width of 1.83 inches and a depth of 0.98 inches. Other dimensions for the fiber optic cable bend radius control device adequate to guide, protect, support and provide bend radius control for fiber optic cables would be apparent to persons skilled in the art.

It will appreciated by persons skilled in the art that herein described is a fiber optic cable bend radius control device and method of use. While the present invention has been described by reference to various preferred embodiments, it will be understood by persons skilled in the art that many modifications and variations may be made in those preferred embodiments without departing from the spirit and scope of the present invention. Accordingly, it is intended that the invention not be limited to the disclosed preferred embodiments and that it have the full scope permitted by the following claims.

I claim:

1. In combination with a cable-routing, vertical, slotted channel member defined by walls and comprising a plurality of longitudinally spaced cable slots therein adapted for receiving and distributing optical fiber cable into and out of said vertical channel member, the improvement comprising a cable bend radius control attachment mounted adjacent at least one of said plurality of cable slots, said bend radius control attachment comprising a generally U-shaped flange having an inner edge portion secured to a mouth of said cable slot and an opposing outer edge portion spaced from the mouth of said cable slot, said flange having a generally convex, arcuate surface between its inner and outer edge portions extending outwardly from the mouth of said cable slot, and defining a predetermined minimum bend radius for cable entering or exiting said channel member through said cable slot, and said flange comprising a base and opposing resilient sides integrally-formed with said base, said opposing sides being flexible inwardly to insert the inner edge portion of said flange into the mouth of said cable slot and recovering to hold said flange in position at the mouth of said cable slot.

2. A combination according to claim 1, wherein said mounting means comprises spaced apart, outwardly extending projections formed adjacent the inner edge portion of said flange and cooperating to form a locking groove along an outer surface of said flange, said locking groove receiving a portion of the mouth of said cable slot to secure said flange to said vertical channel member.

3. A combination according to claim 1, wherein said convex, arcuate surface of said attachment is formed between the inner and outer edge portions of said flange, and extends from one end of said flange to the other.

4. A cable bend radius control attachment for use in combination with a cable-routing, vertical, slotted channel member defined by walls and comprising a plurality of longitudinally spaced cable slots therein adapted for receiving and distributing optical fiber cable into and out of the vertical channel member, said attachment comprising a generally U-shaped flange having an inner edge portion secured to a mouth of said cable slot and an opposing outer edge portion spaced from the mouth of said cable slot, said flange having a generally convex, arcuate surface between its inner and outer edge portions for extending outwardly from the channel member at a mouth of the cable slot, and defining a predetermined minimum bend radius for cable entering or exiting the channel member through the cable slot, and said flange comprising a base and opposing resilient sides integrally-formed with said base, said opposing sides being flexible inwardly to insert the inner edge portion of said flange into the mouth of said cable slot and recovering to hold said flange in position at the mouth of said cable slot.

5. A cable bend radius control attachment according to claim 4, wherein said mounting means comprises spaced apart, outwardly extending projections formed adjacent the inner edge portion of said flange and cooperating to form a locking groove along an outer surface of said flange, said locking groove being adapted to receive a portion of the mouth of the cable slot to secure said flange to the vertical channel member.

6. A cable bend radius control attachment according to claim 4, wherein said convex, arcuate surface is formed between the inner and outer edge portions of said flange, and extends from one end of said flange to the other.

* * * * *